United States Patent
Miyata et al.

(10) Patent No.: US 11,215,258 B2
(45) Date of Patent: Jan. 4, 2022

(54) HYDRAULIC SHOCK ABSORBER

(71) Applicant: Showa Corporation, Gyoda (JP)

(72) Inventors: Hiroyuki Miyata, Fukuroi (JP); Yosuke Murakami, Fukuroi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 58 days.

(21) Appl. No.: 16/722,273

(22) Filed: Dec. 20, 2019

(65) Prior Publication Data
US 2020/0141466 A1 May 7, 2020

Related U.S. Application Data

(63) Continuation of application No. PCT/JP2017/031568, filed on Sep. 1, 2017.

(30) Foreign Application Priority Data

Aug. 29, 2017 (JP) .............................. JP2017-164641

(51) Int. Cl.
*F16F 9/49* (2006.01)
*F16F 9/18* (2006.01)
*B60G 13/08* (2006.01)

(52) U.S. Cl.
CPC ................ *F16F 9/18* (2013.01); *B60G 13/08* (2013.01); *B60G 2202/24* (2013.01); *B60G 2206/41* (2013.01)

(58) Field of Classification Search
CPC ...... F16F 9/064; F16F 9/18; F16F 9/22; F16F 9/34; F16F 9/49; B60G 13/08; B60G 15/062

(Continued)

(56) References Cited

U.S. PATENT DOCUMENTS

| 4,372,545 A | 2/1983 | Federspiel |
| 5,738,190 A | 4/1998 | Deferme |

(Continued)

FOREIGN PATENT DOCUMENTS

| CN | 101134487 A | 3/2008 |
| CN | 102410332 A | 4/2012 |

(Continued)

OTHER PUBLICATIONS

International Search Report dated Oct. 10, 2017 for the corresponding PCT International Patent Application No. PCT/JP2017/031568.

(Continued)

*Primary Examiner* — Christopher P Schwartz
(74) *Attorney, Agent, or Firm* — Leason Ellis LLP

(57) ABSTRACT

A hydraulic shock absorber includes: a cylinder; a piston rod on which a first piston, a valve, and a second piston are disposed sequentially from one end side; and an oil lock portion that is disposed on the one end side inside the cylinder, and that forms a gap flow path between the oil lock portion and an outer circumferential surface of the first piston. The first piston has a piston internal flow path, and is displaceable in an axial direction of the piston rod. When the piston rod moves toward the one end side, the first piston relatively moves toward the other end side with respect to the piston rod and the other end side of the first piston abuts against the valve, so that due to a flow of working oil passing through the piston internal flow path, the valve bends to generate damping force.

8 Claims, 7 Drawing Sheets

(58) Field of Classification Search
USPC ......... 188/282.5, 282.6, 286, 287, 288, 315, 188/322.15
See application file for complete search history.

(56) References Cited

U.S. PATENT DOCUMENTS

| | | | | |
|---|---|---|---|---|
| 6,241,060 | B1* | 6/2001 | Gonzalez | B62K 25/08 188/319.2 |
| 7,320,388 | B2* | 1/2008 | de Molina | F16F 9/34 188/281 |
| 9,605,726 | B2* | 3/2017 | Baldoni | B60G 15/062 |
| 2002/0027051 | A1 | 3/2002 | Grundei | |
| 2002/0053493 | A1* | 5/2002 | Sintorn | F16F 9/064 188/282.9 |
| 2008/0053764 | A1 | 3/2008 | Tomonaga et al. | |
| 2014/0084528 | A1 | 3/2014 | Murakami | |
| 2015/0276006 | A1* | 10/2015 | Smith | F16F 9/22 188/284 |
| 2018/0119770 | A1* | 5/2018 | Bruno | F16F 9/516 |
| 2018/0187738 | A1 | 7/2018 | Förster | |

FOREIGN PATENT DOCUMENTS

| | | |
|---|---|---|
| CN | 103661749 A | 3/2014 |
| CN | 106415053 A | 2/2017 |
| DE | 19842562 C1 | 11/1999 |
| EP | 0003458 A1 | 8/1979 |
| JP | 56-088866 U | 7/1981 |
| JP | 60-037471 Y2 | 11/1985 |
| JP | 2000-170821 A | 6/2000 |
| JP | 2002-106624 A | 4/2002 |
| JP | 2012-031887 A | 2/2012 |
| JP | 2013-096474 A | 5/2013 |
| JP | 5826595 B2 | 12/2015 |
| JP | 2016-003675 A | 1/2016 |
| WO | WO-2016/127076 A1 | 8/2016 |
| WO | WO-2016/146660 A1 | 9/2016 |

OTHER PUBLICATIONS

Chinese Office Action dated Mar. 3, 2021 for the corresponding Chinese Patent Application No. 201780092554.0.
European Search Report dated May 6, 2021 for the corresponding European Patent Application No. 17923283.0.

\* cited by examiner

HYDRAULIC SHOCK ABSORBER

CROSS-REFERENCE TO RELATED APPLICATION(S)

This application is a continuation of PCT application No. PCT/JP2017/031568, filed on Sep. 1, 2017, which claims the benefit of priority to Japanese Patent Application No. 2017-164641 filed on Aug. 29, 2017, the contents of which are incorporated herein by reference.

TECHNICAL FIELD

The present invention relates to a hydraulic shock absorber which absorbs shock from a road surface.

BACKGROUND ART

A hydraulic shock absorber provided with a piston moving in an axial direction of a piston rod in response to extension/compression of an elastic body has been disclosed in PTL 1. The piston is pressed so that one end surface of the piston can be contacted with or separated from a damping valve by the elastic body.

A shock absorber in which a first piston mounted on a piston rod is inserted into a cup-like component inside a cylinder has been disclosed in PTL 2. In the shock absorber, the first piston is inserted into an internal space of the cup-like component so that different damping force from that in a case where the first piston is positioned outside the internal space occurs.

PTL 1: Japanese Unexamined Patent Application Publication "JP-A-2013-96474 (Laid Open on May 20, 2013)"
PTL 2: Japanese Unexamined Patent Application Publication "JP-A-2000-170821 (Laid Open on Jun. 23, 2000)"

According to the invention of PTL 1, the magnitude of occurring damping force cannot be changed in accordance with the position of the piston.

According to the invention of PTL 2, when the first piston enters the cup-like component, working oil flows through a flow path formed in the first piston so that the damping force occurs.

An object of the present invention is to provide a hydraulic shock absorber which can use a different mechanism from the background art to generate damping force dependent on the position of a piston.

SUMMARY OF INVENTION

According to an aspect of the present invention, there is provided a hydraulic shock absorber including: a cylinder; a piston rod that is inserted into the cylinder, and on which a first piston, a valve, and a second piston configured to slide against the cylinder are disposed sequentially from one end side; and an oil lock portion that is disposed on the one end side inside the cylinder, and that forms a gap flow path between the oil lock portion and an outer circumferential surface of the first piston when the first piston is inserted into the oil lock portion; wherein: the first piston has a piston internal flow path through which the one end side and the other end side that is an opposite side to the one end side communicate with each other, and the first piston is displaceable in an axial direction of the piston rod; and when the piston rod moves toward the one end side, the first piston relatively moves toward the other end side and the other end side of the first piston abuts against the valve, so that due to a flow of working oil passing through the piston internal flow path, the valve bends to generate damping force.

In addition, according to another aspect of the present invention, there is provided a hydraulic shock absorber including: a cylinder in which an opening portion for letting out working oil is formed in a one end side wall portion; and a piston rod that is inserted into the cylinder and on which a first piston, a valve and a second piston are disposed sequentially from the one end side; wherein: the first piston has a large diameter portion that is larger in diameter than any other portion of the first piston and that forms a gap flow path between the large diameter portion and an inner surface of the cylinder; the first piston further has a piston internal flow path through which the one end side and the other end side that is an opposite side to the one end side communicate with each other, and the first piston is displaceable in an axial direction of the piston rod; and when the piston rod moves toward the one end side, the first piston moves toward the other end side and the other end side of the first piston abuts against the valve, so that due to a flow of working oil passing through the piston internal flow path, the valve bends to generate damping force.

In addition, according to a further aspect of the present invention, there is provided a hydraulic shock absorber including: a cylinder; a piston rod that is inserted into the cylinder, and on which a first piston, a valve, and a second piston configured to slide against the cylinder are disposed sequentially from one end side; and an oil lock portion that is disposed on the one end side inside the cylinder, and that forms a gap flow path between the oil lock portion and an outer circumferential surface of the first piston when the first piston is inserted into the oil lock portion; wherein: the first piston has a piston internal flow path through which the one end side and the other end side communicate with each other, and is displaceable in an axial direction of the piston rod; and when the piston rod moves toward the one end side, the first piston relatively moves toward the other end side with respect to the piston rod and the other end side of the first piston abuts against the valve, so that due to a flow of working oil passing through the piston internal flow path, the valve bends to generate damping force.

According to an aspect of the present invention, it is possible to provide a hydraulic shock absorber which can generate damping force dependent on the position of a piston.

DESCRIPTION OF EMBODIMENTS

Embodiment 1

An embodiment of the present invention will be described below in detail.

(Configuration of Hydraulic Shock Absorber 1)

Figure 1A:
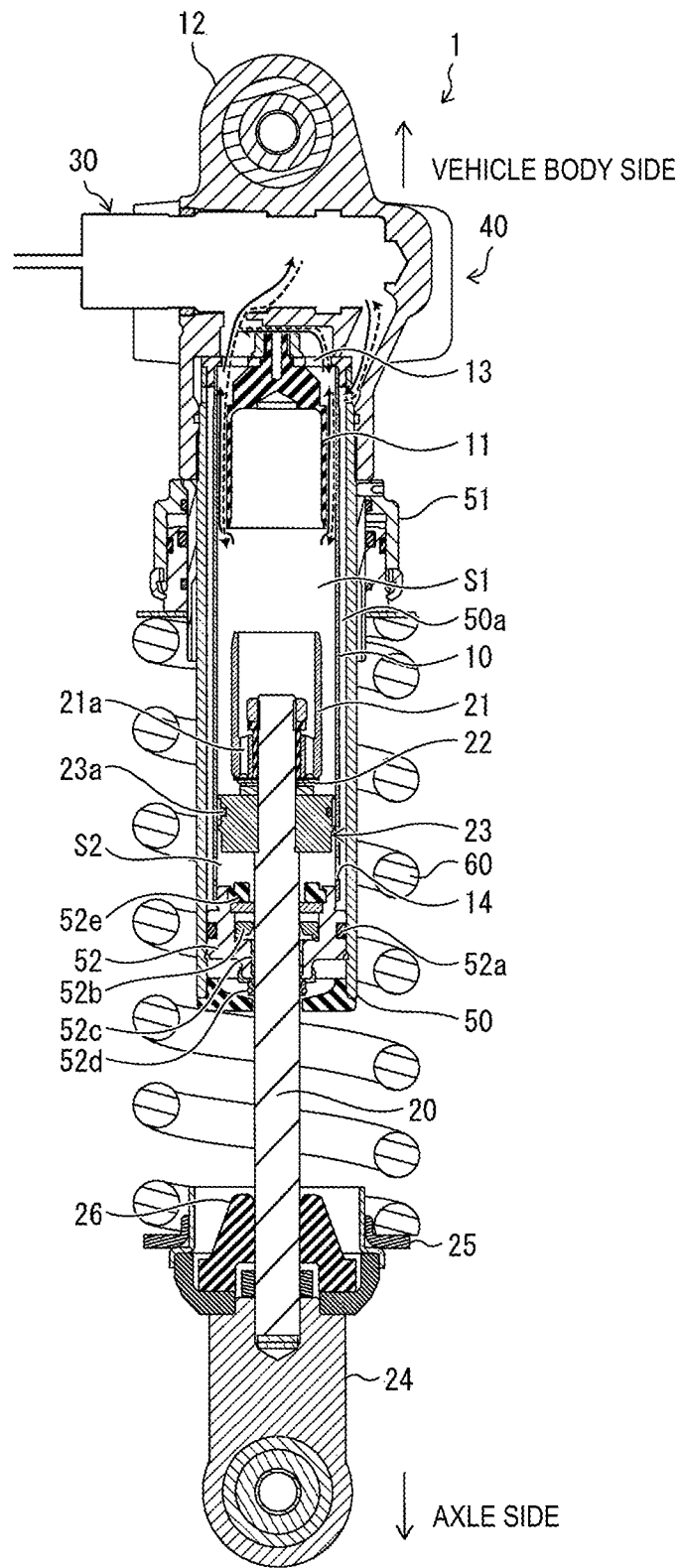
FIG. 1A is a view showing an overall configuration of an extended state of a hydraulic shock absorber according to Embodiment 1 of the present invention.
Figure 1B:
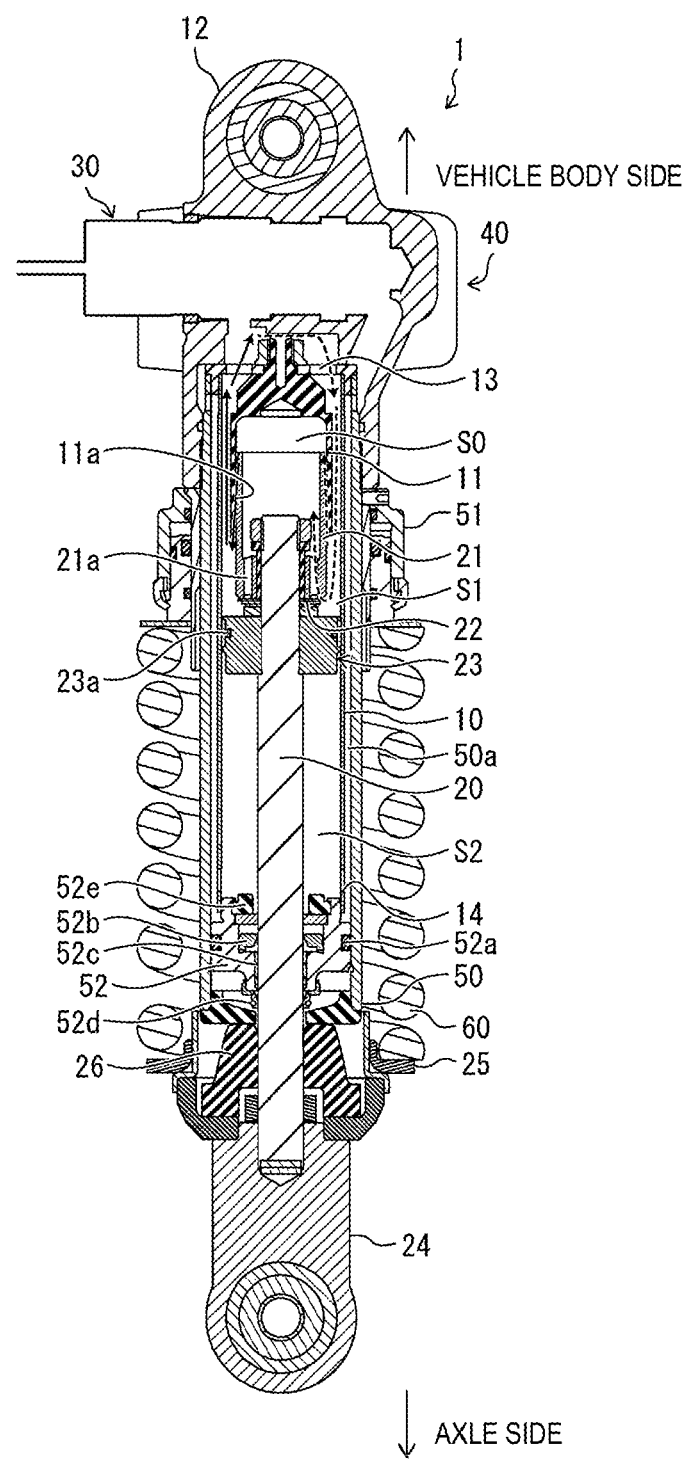
FIG. 1B is a view showing an overall configuration of a state halfway through a compression stroke of the hydraulic shock absorber according to Embodiment 1 of the present invention.

FIG. 1A is a view showing an overall configuration of an extended state of a hydraulic shock absorber 1 according to the present embodiment. FIG. 1B is a view showing an overall configuration of a state halfway through a compression stroke of the hydraulic shock absorber 1 according to the present embodiment. The hydraulic shock absorber 1 is a shock absorber used for rear cushion etc. of a motorcycle. The vehicle in which the hydraulic shock absorber 1 is mounted is not limited particularly but may be a two-wheeled vehicle or a four-wheeled vehicle. As shown in FIG. 1A and FIG. 1B, the hydraulic shock absorber 1 is provided with a cylinder 10, a piston rod 20, a damping force generating portion 30, a sub tank 40, an outer tube 50, and a suspension spring 60.

The cylinder 10 is a tubular member whose vehicle body side (one end side) end portion is fixed to a mounting member 12, and which is internally filled with working oil. The mounting member 12 is a member for mounting the hydraulic shock absorber 1 on the vehicle body. A plurality of hole portions 13 are formed in a vehicle body side portion of the cylinder 10 so that the inside of the cylinder 10 and the damping force generating portion 30 can communicate with each other through the hole portions 13. In addition, a plurality of hole portions 14 are formed in an axle side portion of the cylinder 10 so that the inside of the cylinder 10 and the damping force generating portion 30 communicate with each other through the hole portions 14.

An oil lock portion 11 shaped like a tube whose axle side (the other end side) is opened is disposed on the vehicle body side inside the cylinder 10. A first piston 21 which will be described later is inserted into the oil lock portion 11 so that the working oil present between the oil lock portion 11 and the first piston 21 is compressed. Thus, it is possible to obtain an effect that bottoming of the hydraulic shock absorber 1 can be prevented. The aforementioned effect will be hereinafter called "oil lock effect".

Figure 2:
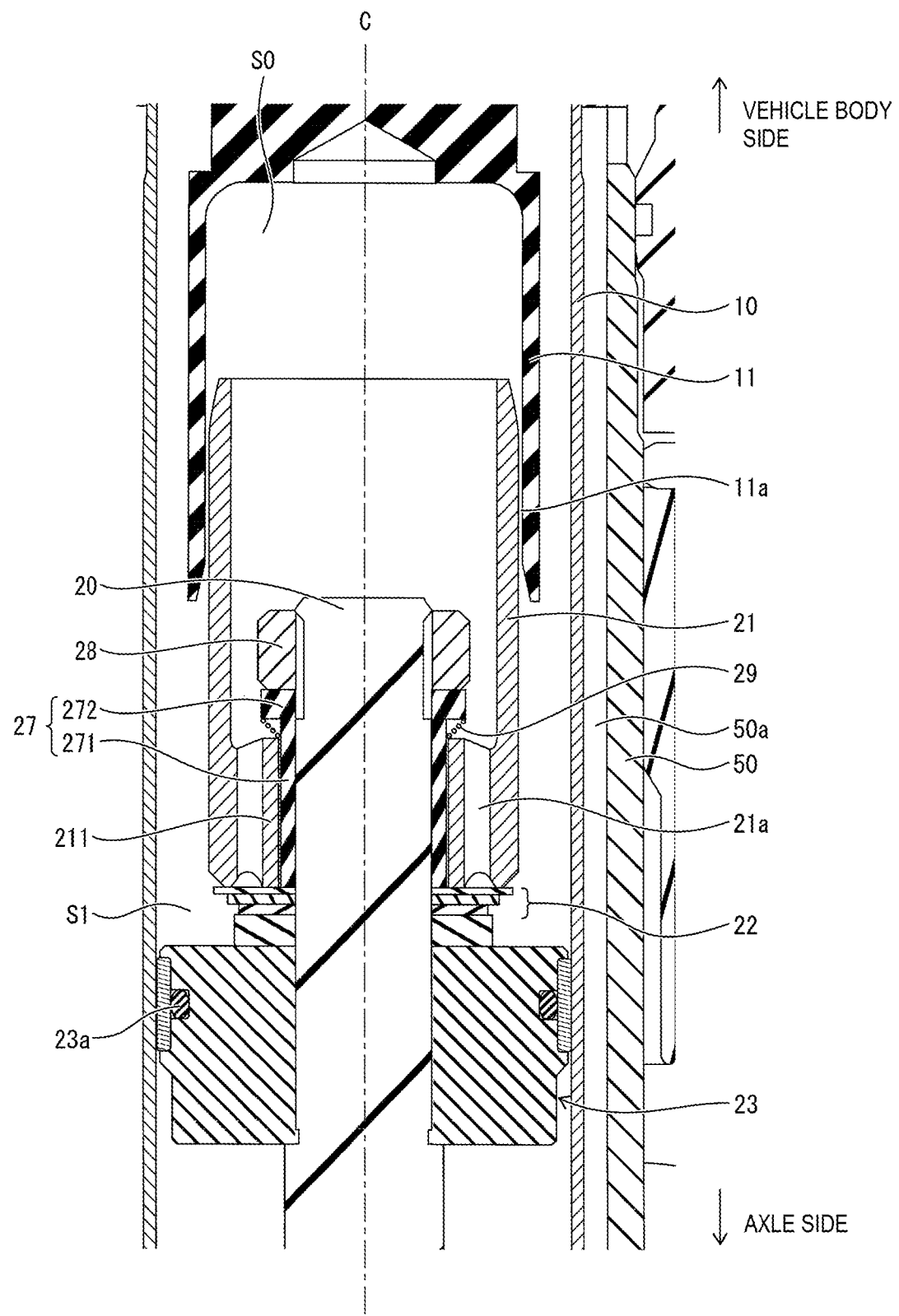
FIG. 2 is a sectional view showing a member disposed on a vehicle body side leading end portion of a piston rod.

The piston rod 20 is a rod-like member which is inserted into the cylinder 10 from the axle side. FIG. 2 is a sectional view showing a member which is disposed on a vehicle body side leading end portion of the piston rod 20. More specifically, FIG. 2 is a sectional view of the hydraulic shock absorber 1 taken along a plane including a central axis C of the piston rod 20. As shown in FIG. 2, the first piston 21, a valve 22, and a second piston 23 are disposed on the vehicle body side leading end portion of the piston rod 20 sequentially from the vehicle body side.

The second piston 23 is a piston sliding against the cylinder 10. By the second piston 23, an internal space of the cylinder 10 is sectioned into a first oil chamber S1 which is positioned on the vehicle body side, and a second oil chamber S2 which is positioned on the axle side. The second piston 23 makes contact with the cylinder 10 through an O-ring 23a provided in an outer circumferential surface of the second piston 23.

The first piston 21 is a piston which is disposed on a vehicle body side end portion of the piston rod 20 and which is shaped like a cylinder opened on the vehicle body side. The first piston 21 is inserted into the oil lock portion 11 in a compressed state of the hydraulic shock absorber 1. Consequently, a small oil chamber S0 is formed between the oil lock portion 11 and the first piston 21 to thereby generate an oil lock effect.

An outer diameter of the first piston 21 is smaller than an inner diameter of the oil lock portion 11 so that a gap flow path 11a is formed between an outer circumferential surface of the first piston 21 and an inner circumferential surface of the oil lock portion 11. When working oil of the small oil chamber S0 is compressed in a compression side stroke, the working oil in the small oil chamber S0 passes through the gap flow path 11a and flows out of the small oil chamber S0. On this occasion, damping force occurs in the gap flow path 11a.

The first piston 21 has a flow path (piston internal flow path) 21a on the axle side so that the inside and the outside of the first piston 21 can communicate with each other through the flow path 21a. The valve 22 in which a plurality of plate valves are laminated is disposed on the axle side of the first piston 21. The valve 22 is a damping valve which bends against a flow of working oil to thereby generate damping force and which has a shape and a size large enough to close an axle side opening portion of the flow path 21a.

The first piston 21 is displaceable in an axial direction of the piston rod 20 with respect to the piston rod 20. When the piston rod 20 moves toward the vehicle body side in the compression side stroke, the first piston 21 relatively moves toward the axle side with respect to the piston rod 20. On the contrary, when the piston rod 20 moves toward the axle side in an extension side stroke, the first piston 21 relatively moves toward the vehicle body side with respect to the piston rod 20.

Specifically, the first piston 21 has a small diameter portion 211 on the axle side. The small diameter portion 211 is smaller in inner diameter than any other portion of the first piston 21. The aforementioned flow path 21a is formed to penetrate the small diameter portion 211 axially. A spacer 27 shaped like a tube is disposed on an outer circumferential surface of the piston rod 20. The spacer 27 has a small diameter portion 271 and a large diameter portion 272. The large diameter portion 272 having an outer diameter larger than an outer diameter of the small diameter portion 271 is positioned on the vehicle body side with respect to the small diameter portion 271. The small diameter portion 211 of the first piston 21 is disposed on a radially outer side of the small diameter portion 271.

An axle side end portion of the spacer 27 abuts against the valve 22. A vehicle body side end portion of the spacer 27 abuts against a stopper 28 provided on a vehicle body side end portion of the piston rod 20. Therefore, the spacer 27 is not displaced axially. The stopper 28 may be, for example, a nut engaged with a screw groove provided in the vehicle body side end portion of the piston rod 20.

A length of the small diameter portion 271 of the spacer 27 is axially longer than a length of the small diameter portion 211 of the first piston 21. Therefore, the first piston 21 can be axially displaced between the large diameter portion 272 of the spacer 27 and the valve 22.

In addition, a valve spring 29 urging the first piston 21 toward the axle side, i.e. toward the side where the valve 22 is positioned is disposed between the small diameter portion 211 and the large diameter portion 272 in the axial direction. The valve spring 29 is an annular member having elasticity, such as a coil spring etc.

In a situation that oil pressure is not applied to the first piston 21, the first piston 21 is displaced toward the axle side by elastic force of the valve spring 29 to abut against the valve 22. In addition, in the compression side stroke, the first piston 21 abuts against the valve 22 more intensely due to resistance of the working oil received because the first piston 21 moves toward the vehicle body side, in addition to the elastic force of the valve spring 29. On the other hand, in the extension side stroke, oil pressure in the small oil chamber S0 decreases temporarily because the first piston 21 moves toward the axle side. Due to a difference in oil pressure between the small oil diameter S0 and the first oil chamber S1 generated on this occasion, the first piston 21 is displaced toward the vehicle body side against the elastic force of the valve spring 29.

Figure 3A:
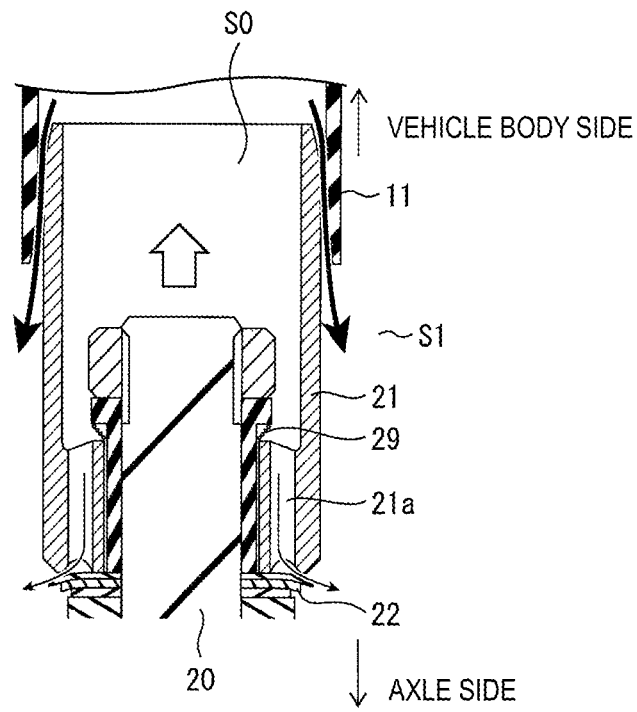
FIG. 3A is a sectional view showing a positional relation between a first piston and a valve in the compression side stroke.
Figure 3B:
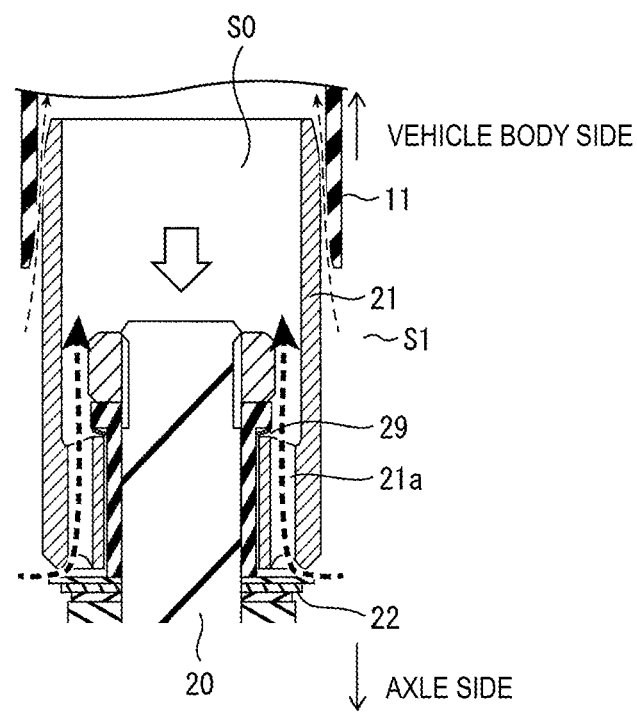
FIG. 3B is a sectional view showing a positional relation between the first piston and the valve in an extension side stroke.

FIG. 3A is a sectional view showing a positional relation between the first piston 21 and the valve 22 in the compression side stroke. FIG. 3B is a sectional view showing a positional relation between the first piston 21 and the valve 22 in the extension side stroke.

In the compression side stroke, an axle side end surface of the first piston 21 and the valve 22 abut against each other, as shown in FIG. 3A. When the first piston 21 enters the oil lock portion 11 in this state, the oil pressure in the small oil chamber S0 increases so that a portion of the working oil in the small oil chamber S0 passes through the flow path 21a to bend the valve 22 so as to flow out to the first oil chamber S1. Due to the valve 22 bending on this occasion, damping force occurs. At the same time, another portion of the working oil in the small oil chamber S0 flows through the gap flow path 11a. On this occasion, damping force also occurs in the gap flow path 11a.

On the other hand, in the extension side stroke, the axle side end surface of the first piston 21 and the valve 22 are separated from each other, as shown in FIG. 3B. Therefore, in the extension side stroke, the axle side opening portion of the flow path 21a is opened so that the working oil can flow into the small oil chamber S0 through the flow path 21a. Therefore, it is possible to prevent the small oil chamber S0 from becoming negative pressure in accordance with the relative movement of the first piston 21 toward the axle side.

In addition, an external diameter of the small diameter portion 271 of the spacer 27 is smaller slightly (e.g. by 0.2 mm) than an internal diameter of the small diameter portion 211 of the first piston 21. Therefore, the first piston 21 can be also displaced in a radial direction of the piston rod 20. In addition, a vehicle body side end portion of the first piston 21 is tapered. Therefore, it is possible to realize a configuration in which even when accuracy of positioning between the first piston 21 and the oil lock portion 11 is not increased, the vehicle body side end portion of the first piston 21 can be guided by an axle side end portion of the oil lock portion 11 so that the first piston 21 can be inserted into the oil lock portion 11.

Incidentally, the first piston 21 does not have to be always shaped like a cylinder, but may be shaped like a tube having another section than a circular section, such as a quadrangular prism section. In this case, the shape of the section of the oil lock portion 11 is also a shape fitted to the shape of the section of the first piston 21. However, when the section of the first piston 21 is circular, it is unnecessary to perform angular alignment between the first piston 21 and the oil lock portion 11. Therefore, it is preferable that each of the first piston 21 and the oil lock portion 11 has a circular shape in section.

As shown in FIG. 1A and FIG. 1B, a mounting member 24 for mounting the hydraulic shock absorber 1 on the axle, and a spring bearing 25 against which the suspension spring 60 abuts are provided on the axle side of the piston rod 20.

A bump rubber 26 is disposed on a vehicle body side of the mounting member 24. The bump rubber 26 absorbs shock when a rod guide 52 and the mounting member 24 are in contact with each other in the compression side stroke of the hydraulic shock absorber 1.

The damping force generating portion 30 communicates with the first oil chamber S1 and the second oil chamber S2. The damping force generating portion 30 generates damping force in accordance with the flow of the working oil generated due to the movement of the piston rod 20. Incidentally, a specific configuration of the damping force generating portion 30 will not be shown because it is irrelevant to the present invention.

The sub tank 40 compensates for working oil corresponding to a volume change amount inside the cylinder 10 due to displacement of the piston rod 20 with respect to the cylinder 10. The sub tank 40 communicates with the first oil chamber S1 and the second oil chamber S2 through the damping force generating portion 30.

The outer cylinder 50 is a tubular member provided on an outer side of the cylinder 10. The outer cylinder 50 is disposed coaxially with the cylinder 10. An annular flow path 50a is formed between an inner circumferential surface of the outer tube 50 and an outer circumferential surface of the cylinder 10 so that the damping force generating portion 30 and the second oil chamber S2 can be made to communicate with each other through the annular flow path 50a. A vehicle body side spring bearing 51 against which the suspension spring 60 abuts is provided on an outer circumference of the outer tube 50.

In addition, a rod guide 52 which the piston rod 20 penetrates is disposed in the vicinity of an axle side end portion of the outer tube 50. The rod guide 52 is a member which is generally shaped like a thick cylinder. The rod guide 52 makes contact with the inner circumferential surface of the outer tube 50 through an O-ring 52a. In addition, the rod guide 52 supports the piston rod 20 so that the piston rod 20 can axially move in an inner hole of the rod guide 52 through an oil seal 52b, a bush 52c, and a dust seal 52d.

In addition, a rebound rubber 52e is disposed on a vehicle body side of the rod guide 52. The rebound rubber 52e absorbs shock caused by contact of the second piston 23 with a vehicle body side surface of the rod guide 52 when the hydraulic shock absorber 1 is most extended.

The suspension spring 60 is compressed to absorb vibration caused by unevenness of a road surface. A vehicle body side end portion of the suspension spring 60 abuts against the vehicle body side spring bearing 51 and an axle side end portion of the suspension spring 60 abuts against the axle side spring bearing 25. In this manner, the positions of the opposite ends of the suspension spring 60 are regulated.

(Flow of Working Oil in Hydraulic Shock Absorber 1)

The flow of the working oil in the hydraulic shock absorber 1 will be described with reference to FIG. 1A and FIG. 1B. In FIG. 1A and FIG. 1B, the flow of the working oil in the compression side stroke is designated by a solid line and the flow of the working oil in the extension side stroke is designed by a broken line.

In the compression side stroke, the working oil flows from the first oil chamber S1 into the damping force generating portion 30 through the hole portions 13 in accordance with movement of the piston rod 20 toward the vehicle body side, as shown in FIG. 1A. Of the working oil flowing into the damping force generating portion 30, some working oil corresponding to an entry volume of the piston rod 20 flows into the sub tank 40, and the remaining working oil flows into the second oil chamber S2 through the annular flow path 50a and the hole portions 14.

Further, in a state the first piston 21 is inserted into the oil lock portion 11 (a trailing end of a stroke) in the compression side stroke, the working oil in the small oil chamber S0 flows into the first oil chamber S1 through the gap flow path 11a, as shown in FIG. 3A. Damping force occurs due to the flow of the working oil. In addition, since the working oil in the small chamber S0 bends the valve 22 from the flow path 21a to flow into the first oil chamber S1, damping force also occurs. Accordingly, the damping force can be generated in accordance with the position of the first piston 21, i.e. a depth of the stroke of the hydraulic shock absorber 1.

When the first piston 21 moves toward the outside of the oil lock portion 11 in the extension side stroke, a portion of the working oil in the first oil chamber S1 flows from the gap flow path 11a and the flow path 21a into the small oil chamber S0, as shown in FIG. 3B.

In addition, the working oil in the second oil chamber S2 flows into the damping force generating portion 30 through the hole portions 14 on the axle side of the cylinder 10 and the annular flow path 50a in accordance with the movement of the second piston 23 toward the axle side. The working oil which has generated the damping force in the damping force generating portion 30 flows into the first oil chamber S1. Further, working oil corresponding to a retraction volume of the piston rod 20 flows from the sub tank 40 into the first oil chamber S1.

(Effect)

As described above, the hydraulic shock absorber 1 according to the present embodiment is provided with the cylinder 10, the piston rod 20, and the oil lock portion 11. The piston rod 20 is inserted into the cylinder 10. The first piston 21, the valve 22, and the second piston 23 sliding against the cylinder 10 are disposed on the piston rod 20 sequentially from the vehicle body side. The oil lock portion 11 is disposed on the vehicle body side inside the cylinder 10. When the first piston 21 is inserted into the oil lock portion 11, the gap flow path 11a is formed between the oil lock portion 11 and the outer circumferential surface of the first piston 21. The first piston 21 has the flow path 21a through which the vehicle body side and the axle side communicate with each other. At the same time, the first piston 21 is displaceable in the axial direction of the piston rod 20. When the piston rod 20 moves toward the vehicle body side, the first piston 21 relatively moves toward the axle side with respect to the piston rod 20. As a result, the axle side of the first piston 21 abuts against the valve 22. Due to the valve 22 bent by the flow of the working oil passing through the flow path 21a, the damping force is generated.

According to the aforementioned configuration, when the piston rod 20 has arrived at the vehicle body side of the cylinder 10, the first piston 21 is inserted into the oil lock portion 11 so that the axle side end surface of the first piston 21 abuts against the valve 22. When the first piston 21 enters the oil lock portion 11 in this state, the oil pressure in the small oil chamber S0 increases so that a portion of the working oil in the small oil chamber S0 passes through the flow path 21a to bend the valve 22 to thereby flow out to the first oil chamber S1. Due to the valve 22 bent on this occasion, damping force occurs. In addition, the flow of the working oil passing through the flow path 21a is partially restricted by the valve 22. Thus, pressure of the working oil in the small oil chamber S0 increases. Due to the working oil flowing through the gap flow path 11a formed between the outer circumferential surface of the first piston 21 and an inner surface of the oil lock portion 11, damping force also occurs. Accordingly, the hydraulic shock absorber 1 can efficiently generate damping force dependent on the position of the first piston 21.

When the piston rod 20 moves toward the axle side, the first piston 21 moves toward the vehicle body side so that the opening portion of the flow path 21a is opened. Accordingly, the working oil flows into the small oil chamber S0 through the flow path 21a. Therefore, it is possible to prevent the small oil chamber S0 from becoming negative pressure so that it is possible to make the hydraulic shock absorber 1 work stably.

In addition, in the hydraulic shock absorber 1, the first piston 21 is displaceable in the radial direction of the piston rod 20. Accordingly, it is possible to realize a configuration in which the first piston 21 can be inserted into the oil lock portion 11 even when the accuracy of the positioning between the first piston 21 and the oil lock portion 11 is not increased.

In addition, in the hydraulic shock absorber 1, the first piston 21 has a tubular shape opened on the vehicle body side, and has the flow path 21a on the axle side. Thus, the first piston 21 is shaped like a tube. Accordingly, it is possible to reduce the weight of the first piston 21 while securing the length of the gap flow path 11a.

Embodiment 2

Another embodiment of the present invention will be described below. Incidentally, for convenience of explanation, members having the same functions as the members described in the aforementioned embodiment will be referred to by the same signs correspondingly and respectively, and description thereof will be omitted.

Figure 4:
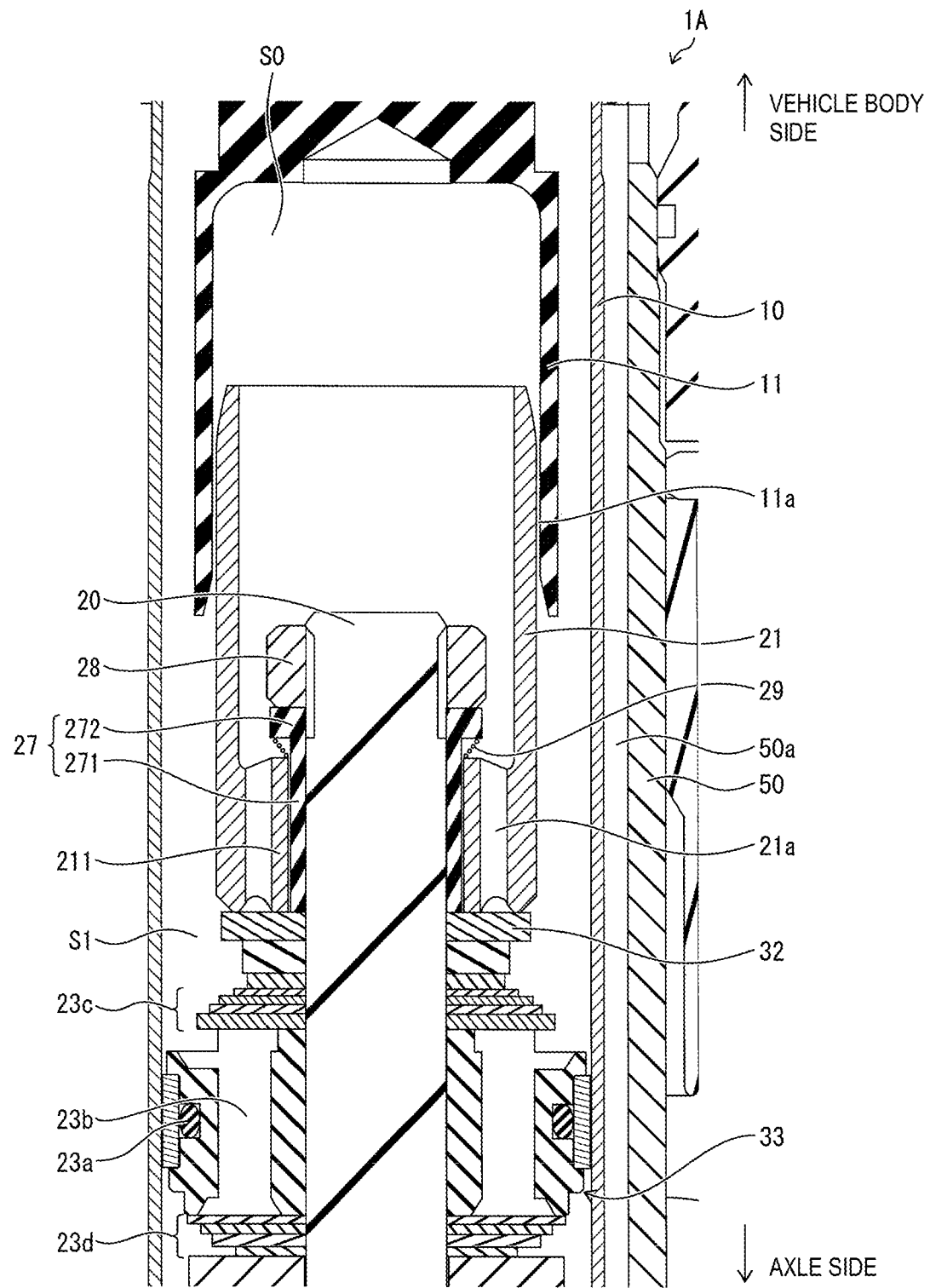
FIG. 4 is a sectional view showing a configuration of an important part of a hydraulic shock absorber according to Embodiment 2 of the present invention.

FIG. 4 is a sectional view showing a configuration of an important part of a hydraulic shock absorber 1A according to the present embodiment. The hydraulic shock absorber 1A is different from the hydraulic shock absorber 1 in that the hydraulic shock absorber 1A is (i) provided with a valve 32 in place of the valve 22, (ii) provided with a second piston 33 in place of the second piston 23, and (iii) further provided with damping valves 23c and 23d (damping force generating valves).

The valve 32 is not a valve for generating damping but a valve for restricting a flow of working oil passing through a flow path 21a. In a compression side stroke of the hydraulic shock absorber 1A, an axle side opening portion of the flow path 21a is closed by the valve 32. Accordingly, the working oil is retrained from flowing through the flow path 21a.

Therefore, in comparison with the hydraulic shock absorber 1, an amount of the working oil flowing through a gap flow path 11a increases, and damping force occurring in the gap flow path 11a increases.

The second piston 33 has a flow path (second piston internal flow path) 23b through which a vehicle body side and an axle side communicate with each other. The damping valves 23c and 23d are disposed on a vehicle body side opening portion and an axle side opening portion of the flow path 23b respectively. The working oil passes through the flow path 23b in accordance with movement of the second piston 31 through a first oil chamber S1 in a compression side stroke and an extension side stroke. Due to the damping valve 23c or 23d bending on this occasion, damping force occurs. Therefore, it is possible to also generate damping force in the second piston 33 in the hydraulic shock absorber 1A.

Embodiment 3

Another embodiment of the present invention will be described below. Incidentally, for convenience of explanation, members having the same functions as the members described in the aforementioned embodiments will be referred to by the same signs correspondingly and respectively, and description thereof will be omitted.

Figure 5A:
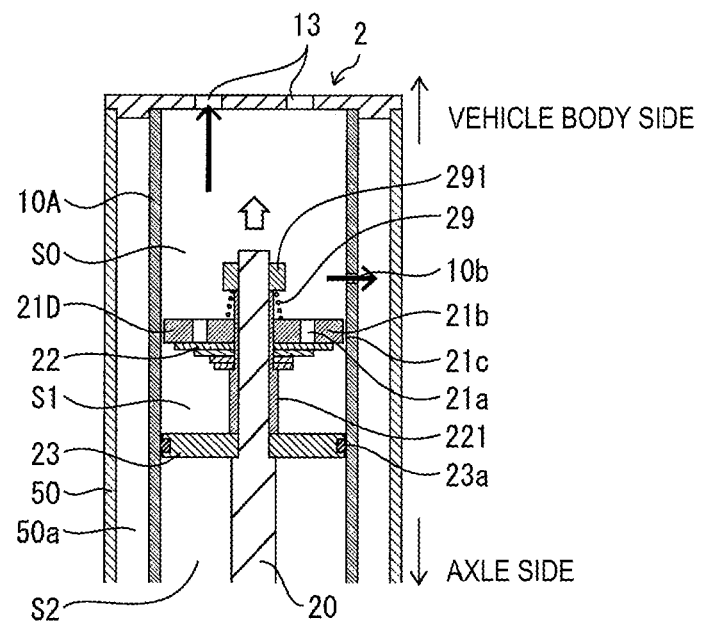
FIG. 5A is a conceptual view showing a configuration of an important part of a hydraulic shock absorber according to Embodiment 3 of the present invention, i.e. a partial sectional view showing a state in which a first piston is positioned on an axle side with respect to an opening portion of a cylinder.
Figure 5B:
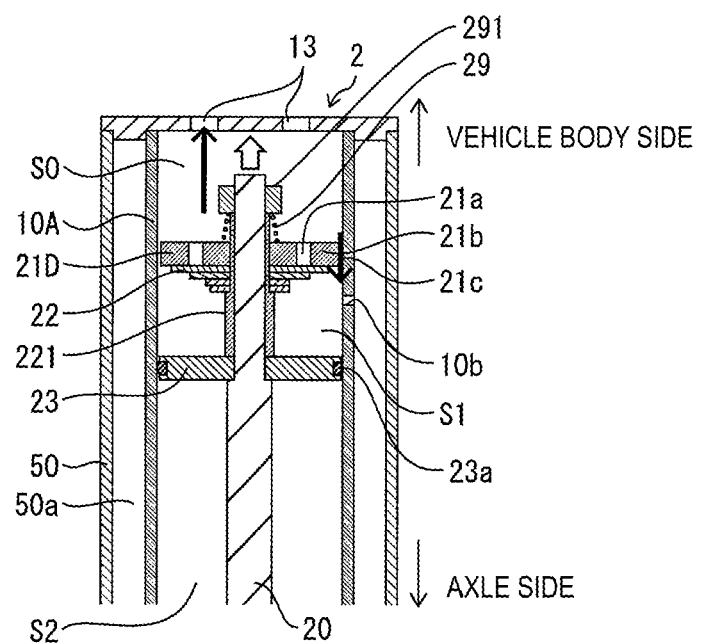
FIG. 5B is a conceptual view showing the configuration of the important part of the hydraulic shock absorber according to Embodiment 3 of the present invention, i.e. a partial sectional view showing a state in which the first piston is positioned on a vehicle body side with respect to the opening portion in a compression side stroke.
Figure 5C:
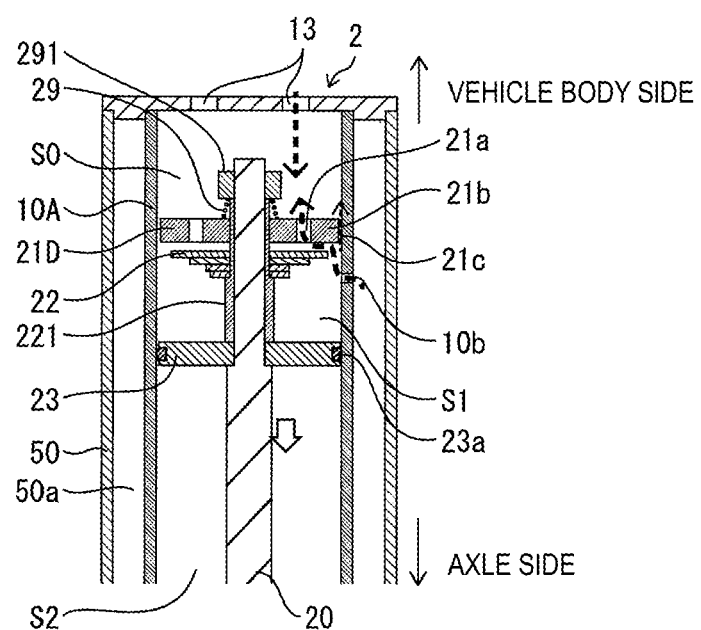
FIG. 5C is a conceptual view showing the configuration of the important part of the hydraulic shock absorber according to Embodiment 3 of the present invention, i.e. a partial sectional view showing a state in which the first piston is positioned on the vehicle body side with respect to the opening portion in an extension side stroke.

FIG. 5A is a conceptual view showing a configuration of an important part of a hydraulic shock absorber 2 according to the present embodiment, i.e. a partial sectional view showing a state in which a first piston 21D is positioned on an axle side with respect to an opening portion 10b of a cylinder 10A in a compression side stroke. FIG. 5B is a conceptual view showing the configuration of the important part of the hydraulic shock absorber 2 according to the present embodiment, i.e. a partial sectional view showing a state in which the first piston 21D is positioned on a vehicle body side with respect to the opening portion 10b in the compression side stroke. FIG. 5C is a conceptual view showing the configuration of the important part of the hydraulic shock absorber 2 according to the present embodiment, i.e. a partial sectional view showing a state in which the first piston 21D is positioned on the vehicle body side with respect to the opening portion 10b in an extension side stroke. In FIG. 5A to FIG. 5C, a positional relation between a member such as the first piston 21D disposed on a vehicle body side end portion of a piston rod 20 and the opening portion 10b is schematically shown, but description about other members is omitted. A flow of working oil in the compression side stroke is designated by a solid line and the flow of the working oil in the extension side stroke is designated by a broken line.

As shown in FIG. 5A to FIG. 5C, the hydraulic shock absorber 2 is different from the hydraulic shock absorber 1 in that the hydraulic shock absorber 2 is provided with the cylinder 10A in place of the cylinder 10, and provided with the first piston 21D in place of the first piston 21. In addition, the hydraulic shock absorber 2 is different from the hydraulic shock absorber 1 in that the hydraulic shock absorber 2 is not provided with any oil lock portion 11 but the opening portion 10b for letting out the working oil is formed in a vehicle body side wall portion.

The first piston 21D is different from the first piston 21 in that the first piston 21D has a large diameter portion 21b forming a gap flow path 21c between the large diameter portion 21b and an inner surface of the cylinder 10A. In the present embodiment, a space provided on the vehicle body side with respect to the large diameter portion 21b inside the cylinder 10A is a small oil chamber S0. A space between the large diameter portion 21b and a second piston 23 is a first oil chamber S1.

In the example shown in FIG. 5A to FIG. 5C, the whole of the first piston 21D serves as the large diameter portion 21b. However, the large diameter portion 21b may be formed as a portion of the first piston 21D. A thickness of the large diameter portion 21b in an axial direction of the piston rod 20 is larger than an aperture of the opening portion 10b. That is, the large diameter portion 21b has a thickness large enough to cover the opening portion 10b.

In addition, a spring bearing 291 is provided in the vicinity of a vehicle body side end portion of the piston rod 20 in the present embodiment. The position of a vehicle body side end portion of a valve spring 29 is regulated by the spring bearing 291.

In addition, the first piston 21D has a flow path (piston internal flow path) 21a in a similar manner to or the same manner as the first piston 21. At the same time, the first piston 21D is displaceable in the axial direction of the piston rod 20. In addition, a tubular retention member 221 having a step in the axial direction is disposed on an outer circumferential surface of the piston rod 20 between the first piston 21D and the second piston 23. A valve 22 in the present embodiment is retained in the vicinity of the first piston 21D by the retention member 221.

In the compression side stroke, the working oil in the small oil chamber S0 flows into a damping force generating portion 30 from hole portions 13 to thereby generate damping force. Then, some working oil corresponding to an entry volume of the piston rod 20 flows into a sub tank 40 and the remaining working oil flows into a second oil chamber S2.

Further, in a state in which the first piston 21D is positioned on the axle side with respect to the opening portion 10b, a portion of the working oil in the small oil chamber S0 flows from the opening portion 10b into the second oil chamber S2 via an annular flow path 50a, as shown in FIG. 5A. When the first piston 21D arrives at the vehicle body side with respect to the opening portion 10b, working oil flowing out of the opening portion 10b decreases, and working oil flowing through the gap flow path 21c increases, as shown in FIG. 5B. On this occasion, damping force occurs due to the flow of the working oil passing through the gap flow path 21c.

In the extension side stroke, the working oil in the second oil chamber S2 flows into the damping force generating portion 30 to generate damping force, and the working oil then flows into the small oil chamber S0. In addition, a portion of the working oil from the second oil chamber S2 flows into the first oil chamber S1 through the opening portion 10b. In addition, some working oil corresponding to a retraction volume of the piston rod 20 flows from the sub tank 40 into the small oil chamber S0.

Further, as shown in FIG. 5C, the first piston 21 moves toward the axle side in the extension side stroke so that oil pressure in the small oil chamber S0 temporarily decreases. Due to a difference in oil pressure between the small oil chamber S0 and the first oil chamber S1 generated on this occasion, the first piston 21 is displaced toward the vehicle body side against elastic force of the valve spring 29. On this occasion, an axle side opening portion of the flow path 21a is opened. Accordingly, the working oil in the first oil chamber S1 flows into the small oil chamber S0 through the flow path 21a.

Incidentally, a flow path 23b and damping valves 23c and 23d of the second piston 23 are not shown in FIG. 5A to FIG. 5C. However, also in the present embodiment, the second piston 23 may have the flow path 23b and the damping valves 23c and 23d in a similar manner to or the same manner as the hydraulic shock absorber 1A in the embodiment 2.

(Effects)

As described above, the hydraulic shock absorber 2 in the present embodiment is provided with the cylinder 10A and the piston rod 20. In the cylinder 10A, the opening portion 10b for letting out the working oil is formed in the vehicle body side wall portion. The piston rod 20 is inserted into the cylinder 10A. The first piston 21D, the valve 22 and the second piston 23 are disposed on the piston rod 20 sequentially from the vehicle body side. The first piston 21D has the large diameter portion 21b which is larger in diameter than any other portion of the first piston 21D, and which has the gap flow path 21c formed between the large diameter portion 21b and the inner surface of the cylinder 10A. Further, the first piston 21D has the flow path 21a through which the vehicle body side and the axle side communicate with each other. At the same time, the first piston 21D is displaceable in the axial direction of the piston rod 20. When the piston rod 20 moves toward the vehicle body side, the first piston 21D moves toward the axle side so that an axle side of the first piston 21D abuts against the valve 22, and due to the flow of the working oil passing through the flow path 21a, the valve 22 bends to generate damping force.

According to the aforementioned configuration, when the first piston 21D moves toward the vehicle body side with respect to the opening portion 10b of the cylinder 10A, pressure of the working oil present on the vehicle body side with respect to the opening portion 10b increases. On this occasion, the working oil flows through the gap flow path 21c between the inner surface of the cylinder 10A and an outer circumferential surface of the large diameter portion 21b. As a result, the damping force occurs. Moreover, on this occasion, the axle side of the first piston 21D abuts against the valve 22, and the valve 22 bends due to the flow of the working oil passing through the flow path 21a. As a result, the damping force also occurs. Accordingly, damping force dependent on the position of the first piston 21D can be generated efficiently.

When the piston rod 20 then moves toward the axle side, the first piston 21D moves toward the vehicle body side, and the opening portion of the flow path 21a is opened. Therefore, the working oil flows into the small oil chamber S0 through the flow path 21a. The small oil chamber S0 is formed by the cylinder 10 and the first piston 21D. Therefore, it is possible to prevent the small oil chamber S0 from becoming negative pressure so that it is possible to make the hydraulic shock absorber 2 work stably.

The present invention is not limited to the aforementioned respective embodiments but may be changed variously within the scope described in CLAIMS. Any embodiment obtained by suitably combining technical means disclosed respectively in different embodiments is also included in the technical scope of the present invention.

REFERENCE SIGNS LIST 1, 1A, 2 hydraulic shock absorber
10, 10A cylinder
10b opening portion
11 oil lock portion
11a, 21c gap flow path
20 piston rod
21, 21D first piston
21a flow path (piston internal flow path)
21b large diameter portion
22, 32 valve
23, 33 second piston
23b flow path (second piston internal flow path)

The invention claimed is:

1. A hydraulic shock absorber comprising:
a cylinder;
a piston rod that is inserted into the cylinder, and on which a first piston, a valve, and a second piston configured to slide against the cylinder are disposed sequentially in an axial direction of the piston rod from one end side to another end side relative to the cylinder in this order; and
an oil lock portion that is disposed on the one end side of the cylinder, and that forms a gap flow path between the oil lock portion and an outer circumferential surface of the first piston when the first piston is inserted into the oil lock portion; wherein:
the first piston has a piston internal flow path through which a portion of the path at the one end side and another portion of the path at the other end side communicate with each other, and is displaceable in the axial direction of the piston rod; and
when the piston rod moves toward the one end side relative to the cylinder in the axial direction, the first piston relatively moves toward the other end side relative to the cylinder in the axial direction and of the first piston abuts against the valve more intensely so that due to a flow of working oil passing through the piston internal flow path, the valve bends to generate damping force.

2. The hydraulic shock absorber according to claim 1, wherein:
the first piston is displaceable in a radial direction of the piston rod.

3. The hydraulic shock absorber according to claim 2, wherein:
the first piston has a tubular shape opened on the one end side in the axial direction of the piston rod, and has the piston internal flow path on the other end side in the axial direction.

4. The hydraulic shock absorber according to claim 1, wherein:
the first piston has a tubular shape opened on the one end side in the axial direction of the piston rod, and has the piston internal flow path on the other end side in the axial direction.

5. A hydraulic shock absorber comprising:
a cylinder in which an opening portion for letting out working oil is formed in one end side; and
a piston rod that is inserted into the cylinder and on which a first piston, a valve and a second piston are disposed sequentially in an axial direction of the piston rod from the one end side to another end side relative to the cylinder in this order; wherein:
the first piston has a large diameter portion that is larger in diameter than any other portion of the first piston and that forms a gap flow path between the large diameter portion and an inner surface of the cylinder;
the first piston further has a piston internal flow path through which a portion of the path at the one end side and another portion of the path at the other end side communicate with each other, and is displaceable in the axial direction of the piston rod;
when the piston rod moves toward the one end side relative to the cylinder in the axial direction, the first piston moves toward the other end side relative to the cylinder in the axial direction and the first piston abuts against the valve more intensely so that due to a flow of working oil passing through the piston internal flow path, the valve bends to generate damping force;

working oil in the cylinder is partially let out from the opening portion in a state that the first piston is positioned on the other end side with respect to the opening portion; and when the first piston reaches the one end side with respect to the opening portion, working oil let out from the opening portion decreases, and working oil flowing through the gap flow path increases.

6. The hydraulic shock absorber according to claim 5, wherein:

the second piston has a second piston internal flow path through which a portion of the path at the one end side and another portion of the path at the other end side communicate with each other; and a damping force generating valve is disposed on an opening portion of the second piston internal flow path.

7. A hydraulic shock absorber comprising:

a cylinder;

a piston rod that is inserted into the cylinder, and on which a first piston, a valve, and a second piston configured to slide against the cylinder are disposed sequentially in an axial direction of the piston rod from one end side to another end side relative to the cylinder in this order; and an oil lock portion that is disposed on the one end side of the cylinder, and that forms a gap flow path between the oil lock portion and an outer circumferential surface of the first piston when the first piston is inserted into the oil lock portion; wherein:

the first piston has a piston internal flow path through which a portion of the path at the one end side and another portion of the path at the other end side communicate with each other, and is displaceable in the axial direction of the piston rod; and when the piston rod moves toward the one end side relative to the cylinder in the axial direction, the first piston relatively moves toward the other end side relative to the cylinder in the axial direction the first piston abuts against the valve more intensely so that a flow of working oil passing through the piston internal flow path is restricted.

8. The hydraulic shock absorber according to claim 7, wherein:

the second piston has a second piston internal flow path through which a portion of the path at the one end side and another portion of the path at the other end side communicate with each other; and a damping force generating valve is disposed on an opening portion of the second piston internal flow path.

* * * * *